United States Patent
Morasse

(10) Patent No.: US 9,945,985 B2
(45) Date of Patent: Apr. 17, 2018

(54) METHOD FOR MAKING AN OPTICAL ELEMENT HAVING A TEXTURED SURFACE AND AN OPTICAL ELEMENT HAVING A TEXTURED SURFACE

(71) Applicant: CORACTIVE HIGH-TECH INC., Quebec (CA)

(72) Inventor: Bertrand Morasse, Quebec (CA)

(73) Assignee: CORACTIVE HIGH-TECH, INC., Quebec (CA)

(*) Notice: Subject to any disclaimer, the term of this patent is extended or adjusted under 35 U.S.C. 154(b) by 0 days.

(21) Appl. No.: 15/547,501

(22) PCT Filed: Jan. 15, 2016

(86) PCT No.: PCT/CA2016/050034
§ 371 (c)(1),
(2) Date: Jul. 30, 2017

(87) PCT Pub. No.: WO2016/123695
PCT Pub. Date: Aug. 11, 2016

(65) Prior Publication Data
US 2018/0003859 A1   Jan. 4, 2018

Related U.S. Application Data

(60) Provisional application No. 62/112,373, filed on Feb. 5, 2015.

(51) Int. Cl.
*G02B 1/118*   (2015.01)
*G02B 6/02*   (2006.01)
(Continued)

(52) U.S. Cl.
CPC ............ *G02B 1/118* (2013.01); *C03B 37/028* (2013.01); *C03C 25/68* (2013.01); *G02B 5/1857* (2013.01); *G02B 6/02123* (2013.01); *G02B 6/262* (2013.01)

(58) Field of Classification Search
CPC .... G02B 1/118; G02B 6/262; G02B 6/02123; G02B 5/1857; G02B 6/04; C03C 25/68; C03B 37/028
See application file for complete search history.

(56) References Cited

U.S. PATENT DOCUMENTS

| | | | |
|---|---|---|---|
| 7,346,250 B1 | 3/2008 | Dabich, II et al. | |
| 9,828,284 B2 * | 11/2017 | Simpson | ................ C03C 15/00 |
| 2011/0033156 A1 * | 2/2011 | Sanghera | ......... B29D 11/00682 |
| | | | 385/76 |

FOREIGN PATENT DOCUMENTS

| | | |
|---|---|---|
| CA | 2182830 A1 | 8/1997 |
| CA | 2384044 A1 | 12/2002 |
| CA | 2613137 A1 | 1/2007 |

\* cited by examiner

*Primary Examiner* — John M Bedtelyon
(74) *Attorney, Agent, or Firm* — Brinks Gilson & Lione

(57) ABSTRACT

There is provided a method for making an optical element having a textured surface. The method comprises the steps of: a) providing a plurality of primary optical fiber segments, each primary fiber segment comprising one or more cores; b) bundling the primary fiber segments into an assembly with the cores of said primary fiber segments extending parallely; c) transforming the assembly into a secondary structure comprising the parallely extending cores; and d) etching a surface of the secondary structure according to an etch profile of said secondary structure, the etch profile being defined by the parallely extending cores, thereby forming the textured surface of the optical element. An optical element having a textured surface is also provided.

28 Claims, 9 Drawing Sheets

(51) Int. Cl.
*G02B 5/18* (2006.01)
*G02B 6/26* (2006.01)
*C03B 37/028* (2006.01)
*C03C 25/68* (2006.01)

METHOD FOR MAKING AN OPTICAL ELEMENT HAVING A TEXTURED SURFACE AND AN OPTICAL ELEMENT HAVING A TEXTURED SURFACE

CROSS REFERENCE TO RELATED APPLICATIONS

This application is a filing under 35 U.S.C. § 371 of International Patent Application PCT/CA2016/050034, filed 15 Jan. 2016, which claims priority to U.S. Provisional Application No. 62/112,373, filed 5 Feb. 2015, each of which is incorporated by reference in its entirety.

FIELD OF THE INVENTION

The present invention relates to a method for making an optical element having a textured surface, such as, for example, a sub-wavelength microstructured surface providing antireflective properties, and its resulting product.

BACKGROUND

It is well known in the art to provide an antireflective layer on the surface of an optical element to minimize or eliminate losses through Fresnel reflections occurring when light is transmitted through an interface between two different media, for example glass and air. The end faces of optical fibers and the surface of lenses of any size are two examples of optical elements typically requiring an antireflective layer.

It is known in the art to apply an antireflective treatment involving the deposition of antireflective coatings on an interface of an optical element. This technique is based on the application of multilayer interference structures with alternating high and low refractive indices leading to a surface having a low reflectivity. Another technique known in the art involves patterning the interface of an optical element to provide sub-wavelength structures. This technique mimics to property of a moth's eye, which includes a natural nanostructured film preventing reflections. As known in the art, multiple structures of dimensions and periodicity smaller than half the wavelength of light crossing the interface can provide a refractive index gradient which essentially removes the reflection inducing transition at the interface.

Antireflective treatments on optical elements can be challenging to implement. For instance, the equipment needed to perform the deposition of antireflective coatings can be expensive and the deposition process itself can be time consuming. Furthermore, formation of fine sub-wavelength structures on an optical interface requires sophisticated manufacturing techniques such as interference lithography, which are typically costly to undertake and can be both energy and time consuming without achieving repeatedly the desired results.

Thus, there is a need for a more affordable and practical manufacturing method to form a textured surface on an interface of an optical element.

SUMMARY OF THE INVENTION

In accordance with various aspects, there are provided methods for making an optical element having a textured surface involving the use of a fiber or an assembly having multiple cores. The multiple cores define an etch profile which results, upon etching, in the formation of the desired textured surface.

In accordance with an aspect of the invention, there is provided a method for making an optical element having a textured surface. The method comprises the steps of:

a) providing a plurality of primary optical fiber segments, each primary fiber segment comprising one or more cores;

b) bundling the primary fiber segments into an assembly with the cores of the primary fiber segments extending parallely;

c) transforming the assembly into a secondary structure comprising the parallely extending cores; and d) etching a surface of the secondary structure according to an etch profile of the secondary structure, the etch profile being defined by the parallely extending cores, thereby forming the textured surface of the optical element.

In accordance with another aspect, there is also provided an optical element having a textured surface made in accordance with an embodiment of the above method.

In accordance with a further aspect of the invention, there is provided an optical element comprising a secondary structure. The secondary structure includes a plurality of cores extending parallely and transversally to an optical axis of the optical element, the parallely extending cores defining a periodically varying etch profile. The secondary structure has an extremity etched according to the etch profile and forms a textured surface.

The optical element may for example be a lens, a reflector, an optical fiber or the like. In some implementations the texture provides an antireflecting effect on the optical element. In other implementations, the textured surface defines a diffraction grating on the optical element.

Other features and advantages of the invention will be better understood upon reading of embodiments thereof with reference to the appended figures.

DETAILED DESCRIPTION

Figure 1:
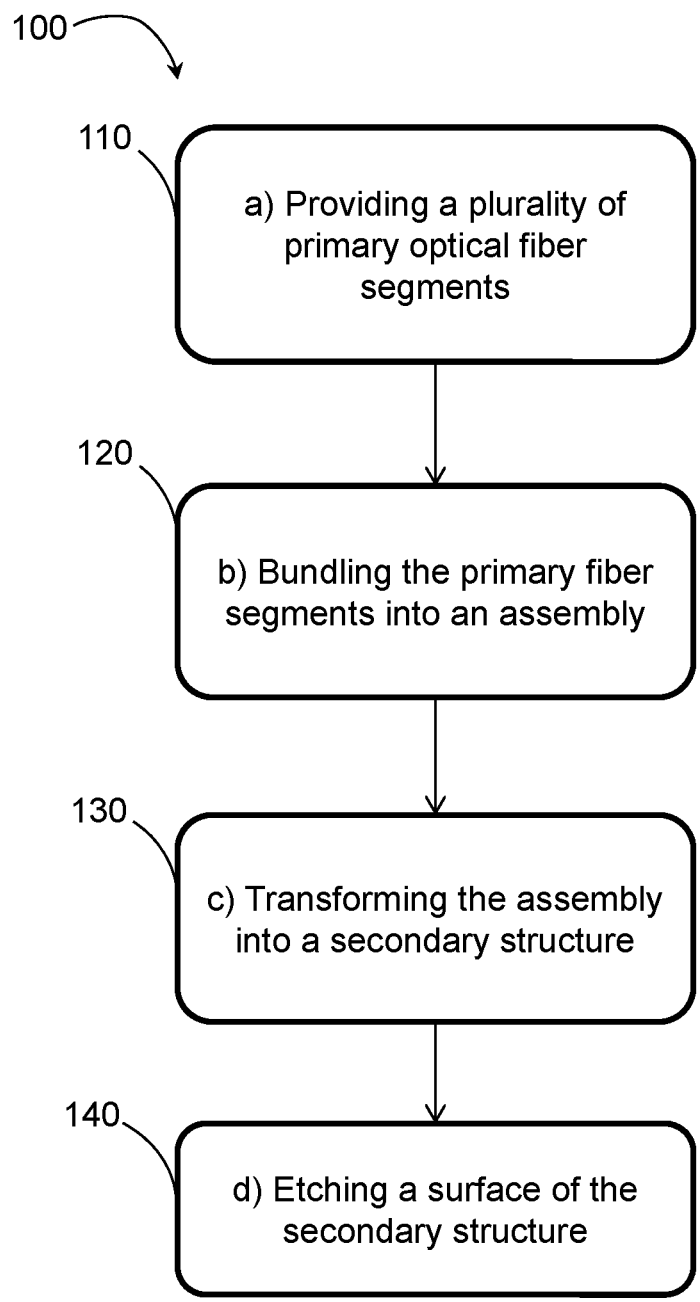
FIG. 1 is a flowchart of a method for making an optical element having a textured surface in accordance with an embodiment.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Of course, numerous modifications could be made to the above-described configurations without departing from the scope of the disclosure.

In accordance with an aspect of the invention, there is provided a method for making an optical element having a textured surface.

As will be readily understood by one skilled in the art, such a textured surface may result in different optical properties depending on the size of the structures defining the texture of the surface. In some implementations an antireflective effect may be desired, in which case the structures of the textured surface are preferably of sub-wavelength dimensions. As known in the art, a sub-wavelength structure typically has a periodicity in the range of or smaller than half the wavelength of the light which is intended to cross the interface without undergoing Fresnel reflections. This limit may therefore vary from one implementation to the next according to various factors such as the wavelength range in which the optical element is to be used, the materials on either sides of the interface, the shape and periodicity of the structures, etc.

In other implementations, the structures of the textured surface may have a periodicity greater than sub-wavelength and within the Bragg regime with respect to light interacting with the optical element, the textured surface therefore acting as a diffraction grating. As it is well known in the art, diffraction gratings have reflective and/or transmissive properties dependent on the wavelength of the light they interact with, and can therefore be used to separate different spectral components of a light beam or signal.

The optical element may be, for example, an optical fiber. The textured surface may therefore be provided on an end face of the fiber, interacting with light entering and/or exiting the fiber. In other embodiments, the optical element may be embodied by a lens, the textured surface covering one or more light interfaces of the lens, totally or in part. In yet another embodiment the optical element may be a reflector. For example, in some applications it may be advantageous to provide a diffraction grating on a reflective surface to provided spectrally selective properties.

In accordance with an aspect of the present invention, the method of making the optical element having a textured surface involves the use of an optical fiber or of an assembly having multiple cores. The multiple cores define an etch profile which results, upon etching, in the formation of the desired textured surface.

With reference to FIG. 1, in accordance with some implementations, the method 100 includes the following steps:
a) providing 110 a plurality of primary optical fiber segments, each primary fiber segment comprising one or more cores;
b) bundling 120 the primary fiber segments into an assembly with the cores of said primary fibers extending parallely;
c) transforming 130 the assembly into a secondary structure comprising the parallely extending cores; and
d) etching 140 a surface of the secondary structure according to an etch profile of said secondary structure, the etch profile being defined by the parallely extending cores, thereby forming the textured surface of the optical element.

Two examples of implementation of the method 100 are described below.

First Example

Figure 2:
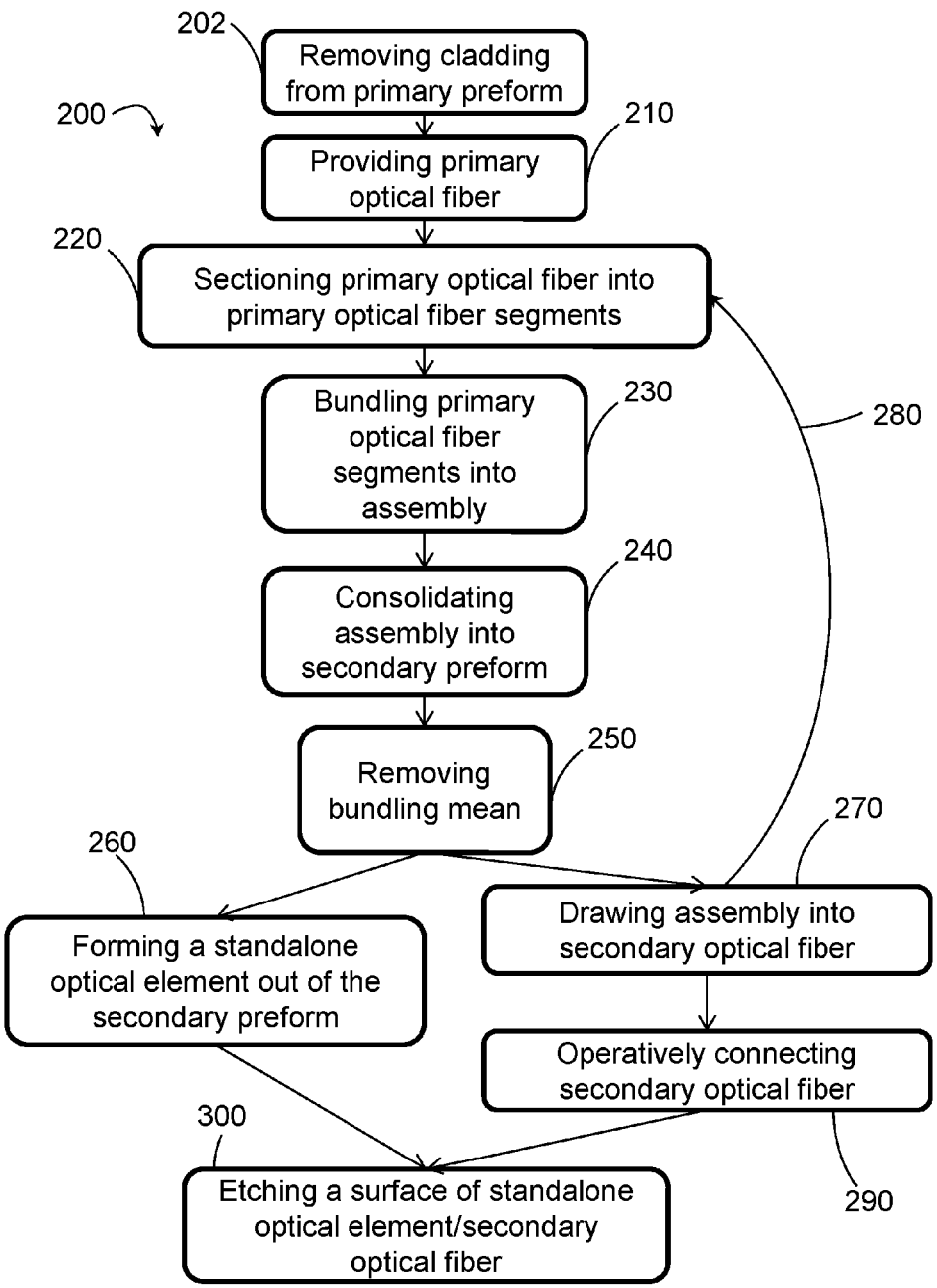
FIG. 2 is a flowchart of the method of FIG. 1 in accordance with a first exemplary embodiment.

Referring to FIG. 2, there is provided a method 200 for making an optical element having a textured surface according to one exemplary implementation of the method 100.

The first step of the method 200 involves providing a plurality of optical fiber segments, each primary optical fiber segment having one or more cores. In the illustrated implementation, this step involves the substeps of providing 210 a primary optical fiber, and sectioning 220 the primary optical fiber into the plurality of primary optical fiber segments. The primary optical fiber can be made of any material suited to make an optical element, such as silica based glass, ZBLAN glasses, chalcogenide glass, plastic materials or the like. Sectioning of the primary optical fiber may be performed using, for instance, suitable scissors or a cleaver.

In an embodiment, the primary optical fiber segments are free of cladding and their cores have an etching profile varying across a radius of the corresponding primary optical fiber segment. This may for example be achieved by providing a cladding-free primary optical fiber which has a core having a varying chemical composition profile and a varying index profile. It is understood that both chemical composition profile and index profile can vary along the optical fiber radius. In other words, the core can have a chemical composition profile that is a function of the radial distance from the center axis of the primary optical fiber. More details about the varying chemical composition profile and varying index profile will be provided further below.

In one variant, the cladding-free primary optical fiber may be obtained from the manufacturing of a fiber initially including one or more claddings surrounding the core and having a different chemical composition profile and index profile than that of the core. As illustrated in FIG. 2, the method 200 may further include an initial substep of removing 202 a cladding surrounding a primary preform comprising the one or more cores, the primary preform being then drawn into the primary optical fiber of the providing step. In another variant, the cladding or claddings can be removed from the primary optical fiber by mechanical or chemical techniques, or a combination thereof, in order to provide a cladding-free primary optical fiber core. In either case, the result is a cladding-free core assembly having a varying chemical composition profile and index profile, both being function of the radius of the assembly.

In other variants primary optical fiber segments without cladding or claddings may be obtained from one or more monolithic structures fabricated directly with the desired chemical composition profile, without having a cladding requiring removal. It will be readily understood by one skilled in the art that the term "core" includes such an embodiment, even though the core in such a case was never part of core-cladding guiding structure. As such, the expression "core" is understood to refer to an elongated structure apt to guide light if surrounded by a cladding, regardless of the manner in which it was fabricated.

Figure 4:
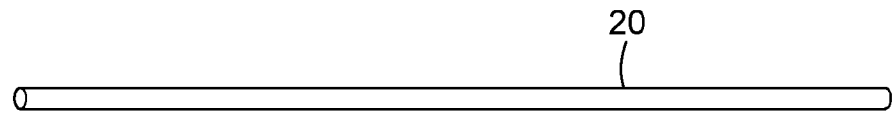
FIG. 4 is a perspective view of a primary optical fiber in accordance with an embodiment.

Referring to FIG. 4, a cladding-free primary optical fiber 20 is schematically illustrated.

Figure 5:
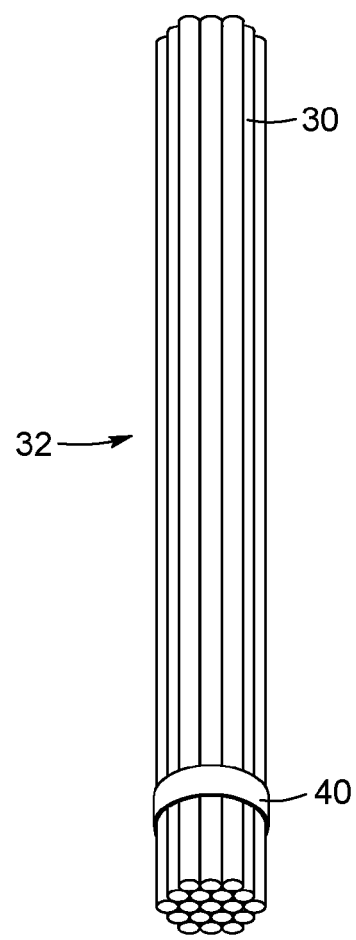
FIG. 5 is a perspective view of a bundle of primary optical fiber segments held in close relation to one another by a ring, in accordance with an embodiment.

As shown in FIG. 5, the plurality of primary optical fiber segments 30 can be of even length. In another embodiment, the plurality of primary optical fiber segments may be sectioned at uneven lengths. It will be readily understood by one skilled in the art that in typical implementations, the surface quality of the cut ends of the plurality of optical fiber segment can be irrelevant to the final quality of the optical element, as the primary optical fiber segments are destined to be later subjected to further drawing and cutting. In other variations, it may be desirable to section the plurality of primary optical fiber segments at selected non-void angle and/or in several different orientations to form facets at an end thereof. Any suitable technique known in the art to section optical fibers may be used, such as for example using scissors or a cleaver suited to section optical fibers.

The length of the individual primary optical fiber segments may be selected to be within the range of a typical fiber preform. The length can vary for example from 10 cm to 1 m. As will be readily understood, the optical fiber drawing process routinely yields kilometers of fiber, and thousands of primary optical fiber segments in the range of 1 m can be obtained from a single primary optical fiber draw.

Referring back to FIG. 2, the next step of the method 200 involves bundling 230 the primary fiber segments into an assembly with the cores of the primary fibers extending parallely. The bundling 230 of the primary optical fiber segments can be performed with different bundling techniques or a combination thereof.

For example, as illustrated in FIG. 5, in one implementation the bundling of the primary optical fiber segments 30 can involve a substep of holding the primary optical fiber segments in close relation to one another by a ring 40 tightened around the bundle of primary optical fiber segments 30. The bundle of primary optical fiber segments 30 thus forms the assembly 32. Alternatively, the primary optical fiber segments can be placed into a tube, such as a silica tube, and packed to be in close relation to one another, hence making a bundle of primary optical fiber segments distributed into a given patterned configuration. In this example, the silica tube can have the same length as the primary optical fiber segments. In yet another embodiment, the primary optical fiber segments can be bundled and held in close relation to one another by a tube sheet having a patterned configuration. The patterned configuration can be a square pattern, a diamond pattern, a spiral, fold symmetry or a combination thereof. The tube sheet can be a plate through which the primary optical fiber segments of the bundle are placed for support and placed into the patterned configuration defined by the holes of the tube sheet. In another embodiment, the bundling of the primary optical fiber segments may involve holding the primary optical fiber segments in close relation to one another and at least partially fusing the segments together. For instance, the primary optical fiber segments can be fused on their longitudinal surface over a portion of their length, for example near an extremity thereof. The fusing of the primary optical fiber segments may be performed using a furnace, a flame, or any heating apparatus capable of fusing the cores, at least partially, together. It is to be understood that other bundling techniques can be used to perform this step of the method.

The next step of the method involves transforming the assembly into a secondary structure comprising the parallely extending cores.

In the embodiment of the method 200 illustrated in FIG. 2, the transforming step involves a substep of consolidating 240 the assembly so as to obtain a secondary preform comprising the parallely extending cores. In other words, after consolidation, the secondary preform comprises the cores which are contiguous to one another and fused together. The substep of consolidating 240 can be conducted using a furnace, a flame, or any heating apparatus capable of fusing the cores together so that the interstitial spaces between the cores shrink partially or completely disappear. In an embodiment, the substep of consolidating 240 is optional since the assembly, being a preform, can be drawn using a drawing tower during a substep of drawing. Partial or complete consolidation thus occurs during drawing. More detail about the substep of drawing is provided below.

Then, if required, the transforming step may further include a substep of removing 250 the bundling mean (the ring, the silica tube, etc.) from the secondary preform. In the case of the bundling mean being a ring, the ring can be removed by cutting away a portion of the secondary preform comprising the ring which can have been consolidated in part with the cores. Other techniques, such as mechanical or chemical techniques or a combination thereof, can be used to remove the bundling mean from the secondary preform.

Still referring to FIG. 2, it is then possible to opt to form different final products. For instance, and not limitative to only those products, a lens, a reflector or an optical fiber can be formed from the secondary preform.

In some implementations, the transforming step further includes a substep of forming 260 a standalone optical element out of the secondary preform, the standalone optical element thus defining the secondary structure. In the present description, the expression "standalone optical element" is understood to be directed to an optical element which is designed to be used as a standalone product without attachment to another component. In some implementations, the standalone optical element can be a lens or a reflector. During the substep of forming 260, the standalone optical element can be formed by cross-sectionally cutting the secondary preform into a shape suitable for making the desired end product. Thus, in some implementations, the lens or the reflector can be shaped and further modified to the desired final design at this stage. A subsequent step of etching 300 of the method 200 will be described further below.

Still referring to FIG. 2, the transforming step may involve, in some implementations, a substep of drawing 270 the assembly so as to obtain a secondary optical fiber. Thus, in such implementations, the secondary optical fiber defines the secondary structure. Hence, the secondary optical fiber comprises the plurality of parallely extending cores. As mentioned above, the substep of drawing 270 can be conducted using a drawing tower and related apparatus suited for manufacturing optical fiber. In contrast to the standalone optical element described above, the secondary optical fiber may be destined to be operatively connected to another optical element, such as another optical fiber. More detail in this regard is provided further below.

Referring to FIGS. 1 and 2, in some implementations, the transforming step 130 may further include additional substeps of:
- sectioning 220 the secondary optical fiber into a plurality of secondary optical fiber segments;
- bundling 230 the secondary fiber segments into a new assembly; and
- drawing 270 the new assembly into a new secondary optical fiber.

In this case, the new secondary optical fiber defines the secondary structure.

Thus, as illustrated in FIG. 2, the additional substeps of sectioning, bundling, and drawing 220, 230, 270 (and optionally the additional substeps of consolidating 240 and removing 250) can be repeated 280 for a plurality of iterations before obtaining the secondary structure. As will be understood by one skilled in the art, each iteration will increase the number of cores within the resulting secondary optical fiber and reduce the size of those cores. The repeating 280 of iterations can be performed until a targeted number of cores is obtained in the secondary structure or until the cores have reached a targeted size as several iterations of these substeps shrink the existing cores smaller and smaller.

For example, a secondary optical fiber obtained after a first iteration of the substep of drawing 270 can be sectioned into a plurality of secondary optical fiber segments; the plurality of secondary optical fiber segments can be bundled into a new assembly; the new assembly can optionally be consolidated into a new preform; the bundling mean can optionally be removed from the new preform, and the new preform can in turn be drawn into a new secondary optical fiber comprising yet more cores parallely extending to one another when compared to the secondary optical fiber obtained after the first iteration, this new secondary optical fiber thus defining the secondary structure. In another variant, the last drawing step may be omitted, and the new preform would therefore define the secondary structure, for example to manufacture a standalone optical element in which the cores are of smaller dimensions.

Still referring to FIGS. 1 and 2, in some implementations, the method 200 further includes an additional step of operatively connecting 290 at least a portion of the secondary optical fiber to another optical fiber after the transforming 130 of step c). For instance, a portion of the secondary optical fiber can be fused to an end surface of another optical fiber which is to be provided with an antireflecting surface or a diffraction grating. It is to be noted that the diameter of the secondary optical fiber that is to be provided with an antireflecting surface or a diffraction grating may be different from the diameter of the optical secondary optical fiber defining the secondary structure.

Referring to FIG. 2, the next step of the method 200 involves a step of etching 300 a surface of the secondary structure according to an etch profile of said secondary structure, the etch profile being defined by the parallely extending cores, thereby forming the textured surface of the optical element. The step of etching 300 is understood to include exposing a surface of the secondary structure to at least one etchant. The etchant may be embodied, for example, by a corrosive liquid such as hydrogen fluoride, potassium hydroxide, ammonia or nitric acid. The etchant can also be a chemically active ionized gas. In some implementations, a transversal surface of the secondary structure is etched. In other implementations, a surface of the secondary structure which is parallel or oblique to an optical axis of the optical element made therefrom is etched. It will be readily understood by one skilled in the art that the etchant may be selected in view of the materials present in the secondary structure and their corresponding etching rates for a given etchant.

As will be readily understood by one skilled in the art, the etching rate at any point of a surface of the secondary structure depends on the chemical composition at that particular point. The chemical composition of the plurality of cores of the secondary structure can therefore be used to define an etching profile which is suited to form the textured surface upon etching.

The chemical composition profile and the varying index profile of a core according to one embodiment will now be described in greater detail. The varying chemical composition may result, for example, from a gradient of dopant concentration inside the core of the primary optical fiber. For silica-based fibers, the dopant may for example be germanium, phosphorous, aluminum, fluorine, boron or combinations thereof. Thus, in an embodiment, each of said cores is doped with at least one dopant selected from the group comprising germanium, phosphorous, aluminum, fluorine and boron. In some implementations, the dopant has a low diffusion rate, to preserve the desired gradient profile during the substeps of consolidating and/or drawing. For instance, aluminum is a dopant having a low diffusion rate.

Figure 6:
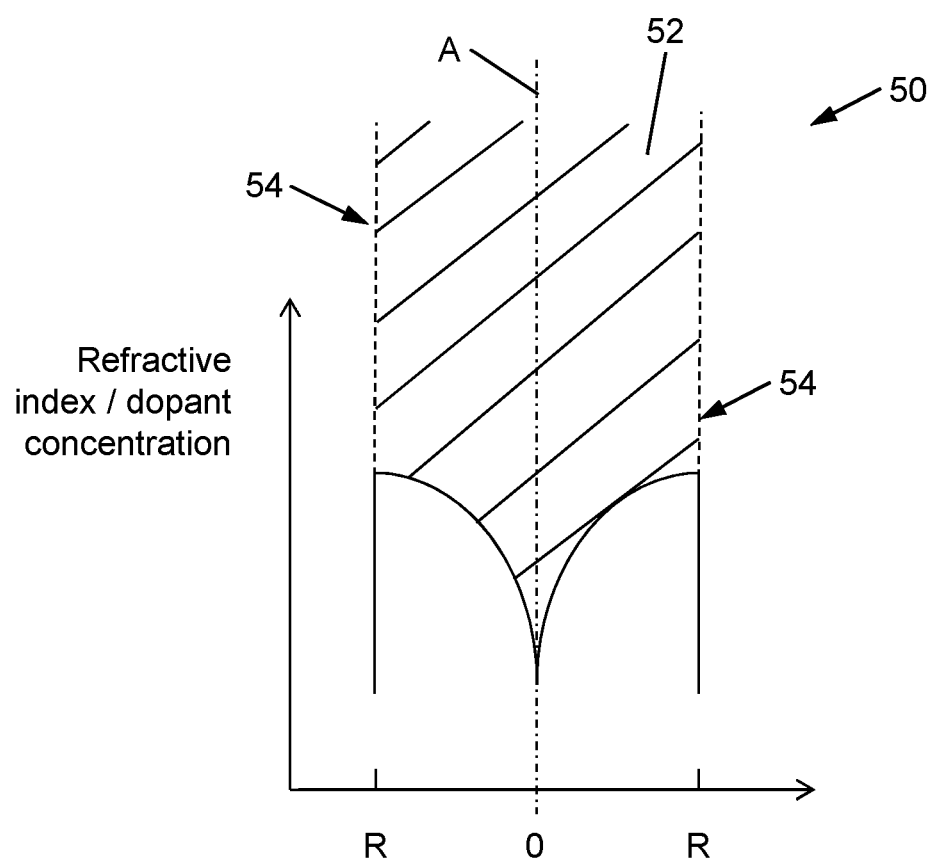
FIG. 6 is a schematic cross-section view of the primary optical fiber in accordance with an embodiment, with a plot showing a dopant concentration and refractive index in the primary optical fiber in relation to the radial distance from a center axis of the primary optical fiber.

Referring to FIG. 6, there is shown a plot of a dopant concentration and refractive index of a primary optical fiber 50 as a function of the radial distance from the center axis A of the primary optical fiber 50. FIG. 6 illustrates a dopant concentration increasing gradually from the center axis A of the primary optical fiber 50 towards an outer surface 54 of the core 52 of the primary optical fiber 50, where R is the radius of the core 52. For instance, the concentration of dopant may vary between the outer surfaces 54 of the primary optical fiber 50 and the center axis A thereof. In some implementations, the etching rate is proportional to the dopant concentration. Therefore, the structure obtained after a given etching period can have a pattern determined by the difference in dopant concentration across the transversal surface of the primary optical fiber.

In the optical elements obtained from the above-described method 200, either a lens, a reflector or a secondary optical fiber, each one of the parallely extending cores exposed to the etchant on a surface of the product is etched according to an etch profile which is a function of the chemical composition profile of the core. Thus, the etched cores form a textured surface upon the etching step 300. In other words, the optical element comprises a secondary structure, the secondary structure including the plurality of cores extending parallely and transversally to an optical axis of the optical element, wherein the parallely extending cores define a periodically varying etch profile. Upon etching of an extremity of the optical element, the secondary structure is etched according to said etch profile and forms a textured surface on the optical element.

Figure 7A:
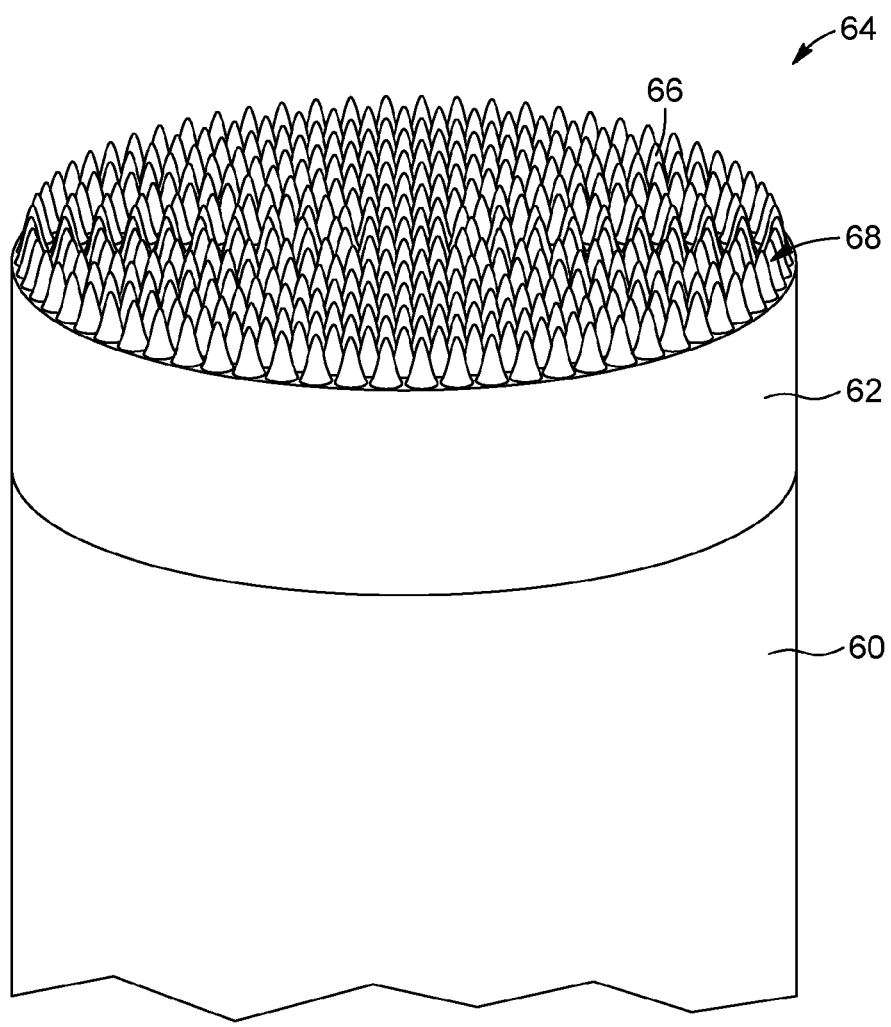
FIG. 7A is a perspective view, fragmented, of an optical fiber comprising at one end an optical element made in accordance with the method of FIG. 1, the optical element having a textured surface, and wherein the size of the substantially conical structures forming the textured surface is exaggerated.

Referring to FIG. 7A, there is shown schematically an optical fiber 60 having at one end an optical element 62 operatively connected thereto. It will be readily understood that the size and relative dimensions of the components shown on FIG. 7A are greatly exaggerated for clarity. The optical element 62 is made in accordance with the method described above. The optical element 62 has a textured surface 64 including substantially conical structures 66. It is understood that in this example, the optical element 62 is a secondary optical fiber operatively connected to the optical fiber 60 and that the size of the substantially conical structures 66 has been exaggerated in this Figure since the substantially conical structures 66 form sub-wavelength structures. The substantially conical structures 66 have been obtained as a surface 68 of the secondary optical fiber 62, which is transversal to an optical axis thereof, has been etched according to said etch profile. The above described etching step, involving the etch profile of the secondary optical fiber 62 and a carefully selected etchant and etching time, has led to the formation of the substantially conical structure 66 on each one of the cores. Given that the cores are transversally distributed over the transversal surface 68 of the secondary optical fiber 62 according to the optical axis thereof, the transversal surface 68 of the secondary optical fiber 62 has an etch profile suited to form the substantially conical structures 66 making the textured surface 64 after etching. Depending on their size, the parallely extending cores of the secondary structure may define sub-wavelength structures on the surface of the secondary structure after etching, the surface of the secondary structure thereby providing an antireflecting effect on the optical element, or may be sized according to a Bragg regime, the surface of the secondary structure thereby defining a diffraction grating.

Figure 7B:
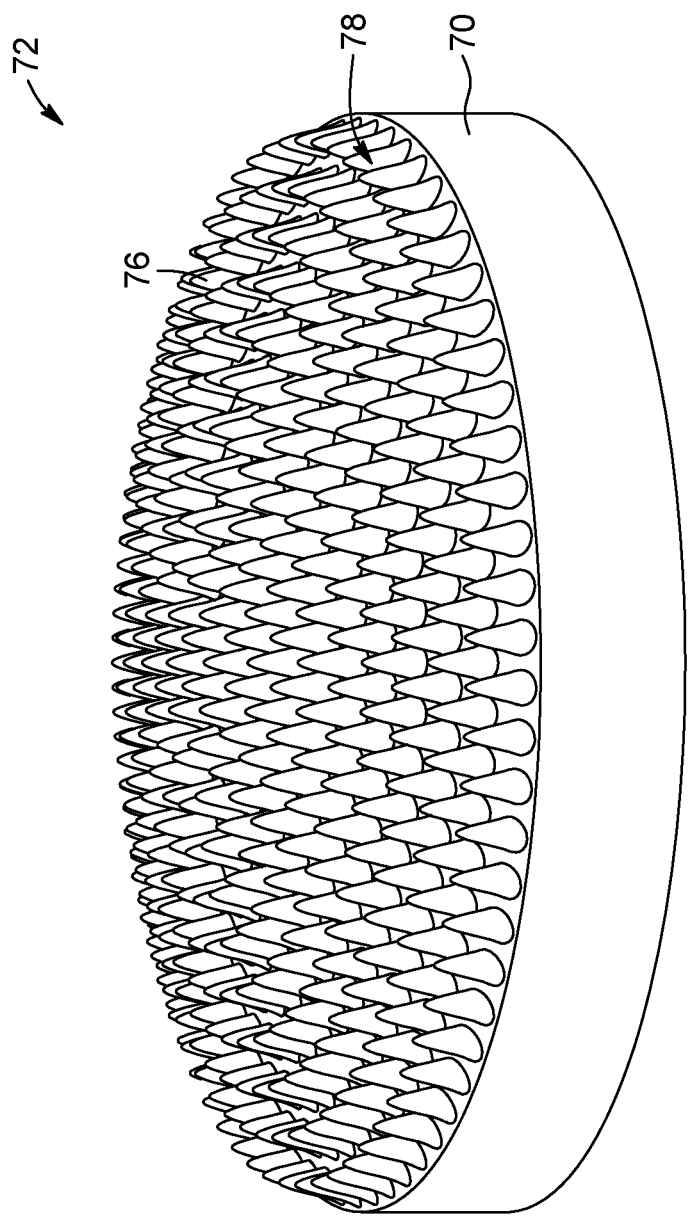
FIG. 7B is a perspective view of a lens made in accordance with the method of FIG. 1, the lens having a textured surface, and wherein the size of the substantially conical structures forming the textured surface is exaggerated.

Referring to FIG. 7B, there is shown an optical element 70 being a lens, the optical element 70 having been made in accordance with the method described above. The lens 70 has a textured surface 72 including substantially conical structures 76, similar to the substantially conical structures 66 described above. In this example, the substantially conical structures 76 forming the textured surface 72 have been obtained as a transversal surface 78 of the lens has been etched according to said etch profile. Again, it will be readily understood that dimensions of the substantially conical structures 76 have been exaggerated for clarity purposes. As in the example shown in FIG. 7A, the substantially conical structures 76 are periodically distributed on the transversal surface 78 of the lens 70 and may provide either an antireflective effect or a Bragg grating to the transversal surface 78 of the lens 70, depending on their size. In another example, a reflective layer can be deposited onto the textured surface to form a reflective grating.

In a variant where a surface of the secondary structure is etched and where said surface is parallel or oblique to an optical axis of the optical element made therefrom, the resulting profile formed by the cores at the etched surface may define lines instead of the peaks shown in FIGS. 7A and 7B. Such an embodiment may be of particular interest in embodiments where the secondary structure is destined to form a diffraction grating.

In an alternative embodiment, the secondary optical fiber features a varying radial concentration of dopant(s) thus providing a variable etching rate of the surface when exposed to an etchant, but at the same time, the secondary optical fiber features a constant refractive index. This combination of features can be achieved for instance by adding a lowering and increasing refractive index dopant in the core simultaneously. For example, known lowering index dopants comprise fluorine and boron while increasing index dopants comprise phosphorous, aluminum, and germanium. For example, a radial gradual increase of phosphorous and fluorine in the secondary optical fiber can yield a constant refractive index while providing a variable etching rate throughout a surface of the secondary optical fiber. The variable etching rate can allow for the formation of a textured surface upon etching. A constant refractive index may be desirable to provide a uniform transmission of light through the material.

In yet another embodiment, the secondary optical fiber can be formed by assembling a combination of different optical fibers. For instance, during the bundling step 120 described above, some optical fibers with a higher or lower overall refractive index can be inserted at various location within the bundle. Thus, a region of the secondary structure formed by the method can act as a core and another region can act as a cladding to enable light transmission in a waveguide region. All regions can be etched in order to provide a textured surface on the resulting product.

Second Example

Figure 3:
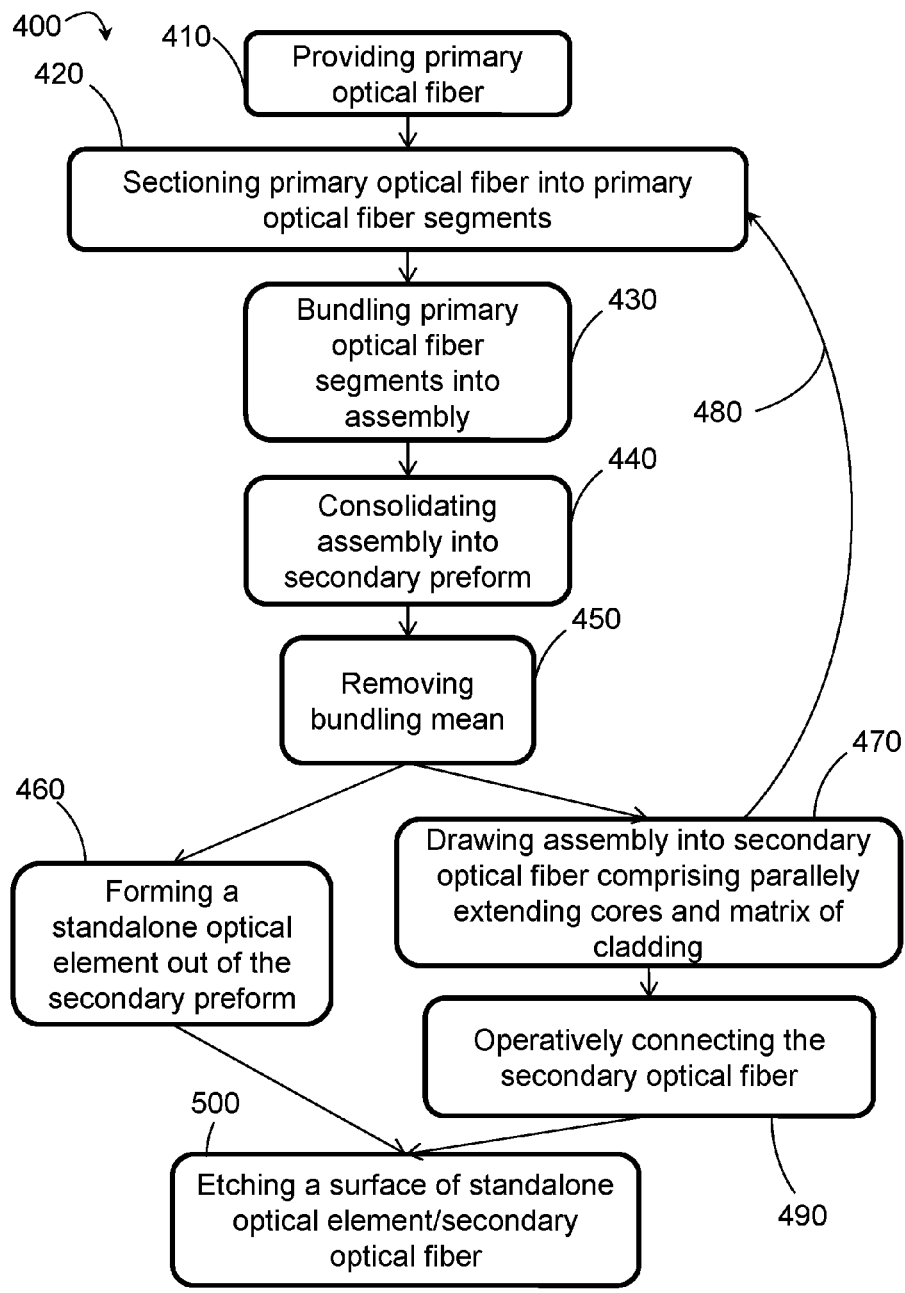
FIG. 3 is a flowchart of the method of FIG. 1 in accordance with a second exemplary embodiment.

Referring to FIG. 3, there is provided a second method 400 for making an optical element having a textured surface according to another example of implementation of the method 100.

The first step of the method 400 involves providing a plurality of primary optical fiber segments, each primary optical fiber segment comprising one or more cores. In the illustrated implementation, this step involves substeps of providing 410 a primary optical fiber, and sectioning 420 the primary optical fiber into the plurality of primary optical fiber segments. The primary optical fiber can be made of any material suited to form an optical element, such as silica based glass, ZBLAN glasses, chalcogenide glass, plastic materials or the like.

In an embodiment, the primary optical fiber segments have one or more cores having a first chemical composition and a first index profile. Each one of the primary optical fiber segments further includes at least one cladding surrounding the one or more cores. The at least one cladding has a second chemical composition profile and a second index profile. In contrast to the method 200 described above, the cladding is preserved on the primary optical fiber segments that are provided.

Referring to the embodiment illustrated in FIG. 3, the sectioning 420 of the primary optical fiber segments is performed using, for instance, suitable scissors or a cleaver. Again, the plurality of primary optical fiber segments can be of even length or of uneven lengths. The plurality of primary optical fiber segments can also be sectioned at any non-void angle and can even be sectioned, in another embodiment, in several different orientations to form facets at an end thereof.

Still referring to FIG. 3, and as explained in the description of the method 200 according to the previous example, the next step of the method 400 involves bundling 430 the primary optical fiber segments into an assembly, the assembly comprising the parallely extending cores, surrounded by their corresponding cladding. It is understood that, in some implementations, the assembly defines a preform. The bundling 430 of the primary optical fiber segments can be performed using different bundling techniques or a combination thereof, as described above.

The next step of the method 400 involves transforming the assembly into a secondary structure comprising the parallely extending cores. Referring to the embodiment of the method illustrated in FIG. 4, this step involves a substep of consolidating 440 the assembly so as to obtain a secondary preform comprising the parallely extending cores. Again, the substep of consolidating 440 can be conducted in a furnace, with a flame or using any heating apparatus capable of fusing the primary optical fiber segments together so that the interstitial spaces between the cladding of each one of the primary optical fiber segments partially shrinks or disappear, leaving the cores surrounded by a consolidated cladding matrix. In some implementations, the substep of consolidating 440 is optional since the assembly can be drawn directly after bundling using a drawing tower during a substep of drawing. Partial or complete consolidation then occurs during drawing. In some applications, a partial consolidation may be desired during the substep of consolidating or for the resulting optical element having a textured surface.

Then, if required, the transforming step further includes a substep of removing 450 the bundling mean (the ring, the silica tube, etc.) from the secondary preform. The substep of removing can be conducted using the techniques described in the method 200.

Still referring to FIG. 3, it is then possible to opt to form different final products. For instance, and not limitative to only those products, a standalone optical element such as a lens or a reflector, comprising the plurality of parallely extending cores surrounded by the matrix of cladding, can be formed. Accordingly, in an embodiment, the standalone optical element can be formed by cross-sectionally cutting the secondary preform into a shape suitable for making the desired end product. The standalone optical element can be shaped and further modified to the desired final design at this stage. A subsequent step of etching 500 of the method 400 will be described further below.

Still referring to FIG. 3, the transforming step may involve, in some implementations, a substep of drawing 470 the assembly so as to obtain a secondary optical fiber. Thus, in such implementations, the secondary optical fiber defines the secondary structure. Hence, the secondary optical fiber comprises the plurality of parallely extending cores surrounded by the matrix of cladding. As mentioned above, the substep of drawing 470 can be conducted using a drawing tower and related apparatus suited for manufacturing optical fiber. In contrast to the standalone optical element described above, the secondary optical fiber may be directed to be operatively connected to another optical element, such as another optical fiber.

Referring to FIGS. 1 and 3, in some implementations, the transforming step 130 of c) further includes additional substeps of:
 sectioning 420 the secondary optical fiber into a plurality of secondary optical fiber segments;
 bundling 430 the secondary fiber segments into a new assembly; and
 drawing 470 the new assembly into a new secondary optical fiber;
such that the new secondary optical fiber defines the secondary structure.

Thus, as illustrated in FIG. 3, the additional substeps of sectioning, bundling, and drawing 420, 430, 470 (and optionally the additional substeps of consolidating 440 and removing 450) can be repeated 480 for a plurality of iterations before obtaining the secondary structure. The repeating 480 of iterations can be performed until a targeted number of cores is obtained in the secondary optical fiber or until the cores and the surrounding cladding matrix have reached a targeted size, as several iterations of these substeps shrink the existing cores and the surrounding cladding matrix smaller and smaller. Thus, in an embodiment, the secondary optical fiber can have a plurality of cores parallely extending to one another, each core being surrounded by a matrix of cladding.

Still referring to FIGS. 1 and 3, in some implementations, the method 400 further includes an additional step of operatively connecting 490 at least a portion of the secondary optical fiber to another optical fiber after the transforming 130 of step c), as described above.

Referring to FIG. 3, the next step of the method 400 involves a step of etching 500 a surface of the secondary structure according to an etch profile of this secondary structure, the etch profile being defined by the parallely extending cores and the surrounding cladding, thereby forming the textured surface of the optical element upon etching. Similar etchants as the ones described above can be used during the step of etching 500. Thus, the optical element comprises a secondary structure, the secondary structure including the plurality of cores extending parallely and transversally to an optical axis of the optical element, wherein the parallely extending cores, each surrounded by a matrix of cladding, define a periodically varying etch profile. Upon etching of an extremity of the optical element, the secondary structure is etched according to said etch profile and forms a textured surface.

Figure 8:
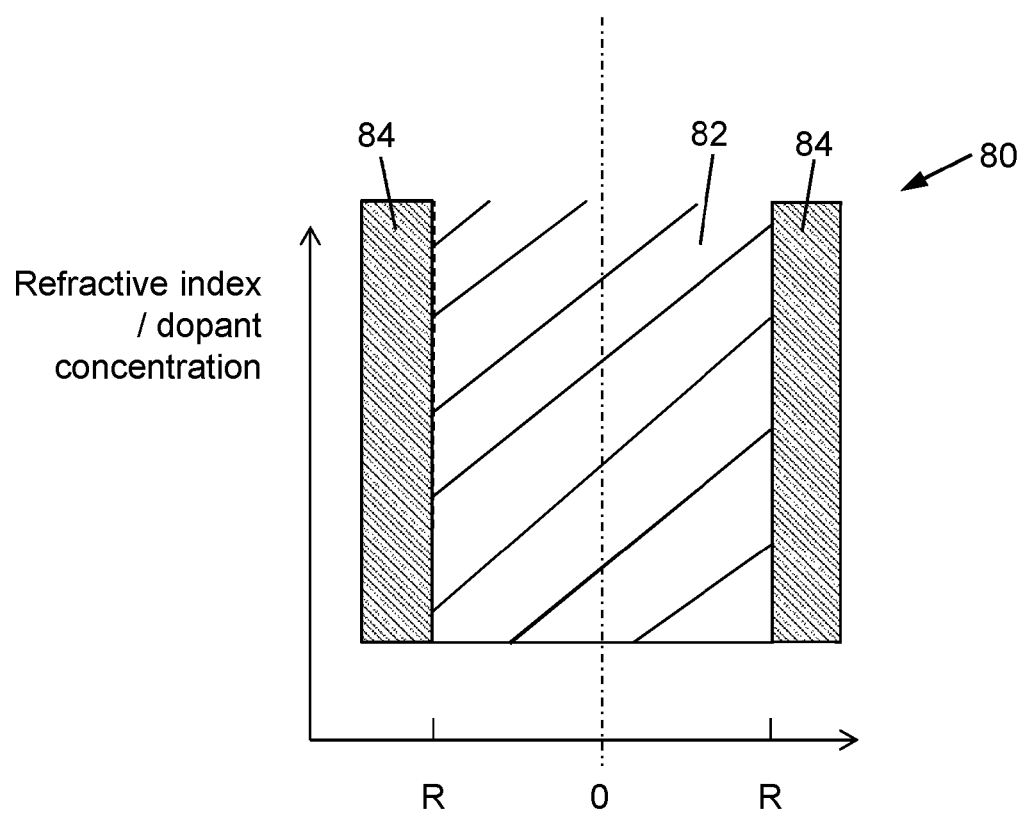
FIG. 8 is a schematic cross-section view of the primary optical fiber in accordance with an embodiment, with a plot showing a dopant concentration and refractive index in the primary optical fiber in relation to the radial distance from a center axis of the primary optical fiber.
Figure 9:
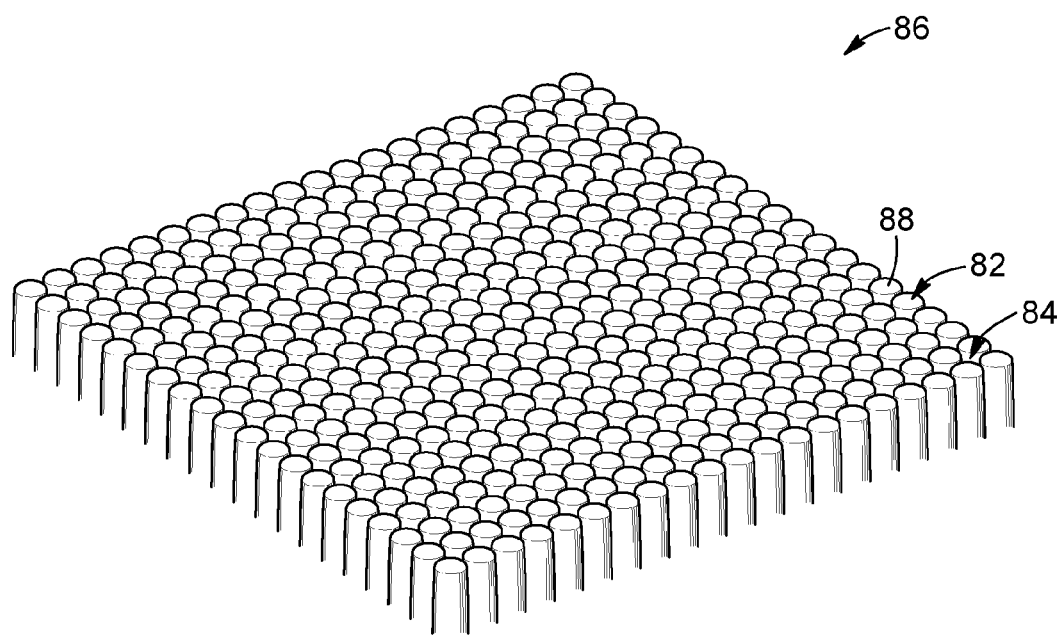
FIG. 9 is a perspective schematic view of the textured surface of the optical element obtained by the method of FIG. 1, wherein the substantially rounded cylindrical structures are of sub-wavelength dimensions.

Referring to FIG. 8, there is schematically illustrated the variation in chemical composition in the primary optical fiber 80 comprising a core 82 and a surrounding cladding 84. Thus, in the secondary optical fiber, the first chemical composition of the one or more cores and the second chemical composition of the surrounding matrix of cladding can lead to a differential etching response. With a carefully selected etchant and etching time, the one or more cores 82 and the surrounding cladding 84 exposed to the etchant can be etched at a different rate leading to the formation of a textured surface over a surface of the secondary structure. Referring to FIG. 9, in accordance with an embodiment, there is shown an extremity of a secondary optical fiber that has been etched according to said etch profile, and forming a textured surface 86. The textured surface 86 is formed of substantially rounded cylindrical sub-wavelength structures 88 formed upon etching of the cores 82 and the matrix of cladding 84. In the illustrated embodiment of FIG. 9, the sub-wavelength structures 88 form a textured surface 86 wherein the sub-wavelength structures 88 are periodically distributed on the transversal surface of the secondary optical fiber, according to an optical axis thereof. The textured surface 86 formed on the secondary optical fiber provides an antireflective effect to the transversal surface of the secondary optical fiber.

In another embodiment, substantially rounded cylindrical holes can be etched into the surface of the secondary optical fiber, lens or optical element using an etchant suited to etch more rapidly the cores compared to the surrounding matrix of cladding. In this embodiment, the operation wavelength of the antireflective surface can depend on the depth of the substantially rounded cylindrical holes provided upon etching.

In a variant, the parallely extending cores and the surrounding matrix of cladding of the secondary structure are sized according to a Bragg regime. Thus, the surface of the secondary structure thereby defines a diffraction grating.

It will be readily understood that the examples above are not limitative to the scope of protection and that other embodiments could involve a different succession of steps than those described herein. In one variant, cores having a varying dopant concentration, such as in example 1 described above, may be used in combination with a secondary optical fiber having a matrix of cladding, such as in example 2 described above.

Of course, numerous modifications could be made to the embodiments above without departing from the scope of the present invention.

The invention claimed is:

1. A method for making an optical element having a textured surface, comprising the steps of:
   a) providing a plurality of primary optical fiber segments, each primary fiber segment comprising one or more cores;
   b) bundling the primary fiber segments into an assembly with the cores of said primary fiber segments extending parallely;
   c) transforming the assembly into a secondary structure comprising the parallely extending cores; and
   d) etching a surface of the secondary structure according to an etch profile of said secondary structure, the etch profile being defined by the parallely extending cores, thereby forming the textured surface of the optical element.

2. The method according to claim 1, wherein step a) comprises the substeps of:
   providing a primary optical fiber; and
   sectioning the primary optical fiber into the plurality of primary optical fiber segments.

3. The method according to claim 2, wherein step a) further comprises a substep of removing a cladding surrounding a primary perform comprising the one or more cores, the primary preform being drawn into the primary optical fiber.

4. The method according to claim 1, wherein the one or more cores of the primary optical fiber segments provided in step a) have an etching profile varying across a radius of the corresponding primary optical fiber segment.

5. The method according to claim 4, wherein the primary optical fiber segments provided in step a) are free of cladding.

6. The method according to claim 1, wherein the primary optical fiber segments provided in step a) each comprise at least one cladding surrounding the one or more cores.

7. The method according to claim 1, wherein step b) comprises a substep of holding the primary optical fiber segments in close relation to one another using at least one of a ring, a tube and a tube sheet, or by fusing them together at least partially.

8. The method according to claim 1, wherein the transforming of step c) comprises a substep of consolidating the assembly so as to obtain a secondary preform comprising the parallely extending cores.

9. The method according to claim 8, wherein the transforming of step c) further comprises forming a standalone optical element out of the secondary preform, the standalone optical element defining the secondary structure.

10. The method according to claim 9, wherein the standalone optical element is a lens or a reflector.

11. The method according to claim 1, wherein the transforming of step c) comprises a substep of drawing the assembly so as to obtain a secondary optical fiber.

12. The method according to claim 11, wherein the secondary optical fiber defines the secondary structure.

13. The method according to claim 11, wherein the transforming of step c) further comprises additional substeps of:
   sectioning the secondary optical fiber into a plurality of secondary optical fiber segments;
   bundling the secondary fiber segments into a new assembly; and
   drawing the new assembly into a new secondary optical fiber;
   wherein the new secondary optical fiber defines the secondary structure.

14. The method according to claim 13, comprising repeating said additional substeps for a plurality of iterations before obtaining the secondary structure.

15. The method according to claim 11, comprising an additional step of operatively connecting at least a portion of the secondary optical fiber to another optical fiber after the transforming of step c).

16. The method according to claim 1, wherein the etching step comprises exposing a surface of the secondary structure to at least one of hydrogen fluoride, potassium hydroxide, ammonia, nitric acid and a chemically active ionized gas.

17. The method according to claim 1, wherein the etching step comprises exposing a surface of the secondary structure which is transversal to an optical axis of the optical element made therefrom.

18. The method according to claim 1, wherein the parallely extending cores of the secondary structure are sized so as to define sub-wavelength structures on the surface of the secondary structure after said etching, the surface of the secondary structure thereby providing an antireflecting effect on the optical element.

19. The method according to claim 1, wherein the parallely extending cores of the secondary structure are sized according to a Bragg regime, the surface of the secondary structure thereby defining a diffraction grating.

20. The method according to claim 1, wherein each of said cores is doped using at least one dopant selected from the group comprising germanium, phosphorous, aluminum, fluorine and boron.

21. An optical element comprising a secondary structure, the secondary structure comprising a plurality of cores extending parallely and transversally to an optical axis of the optical element, the parallely extending cores defining a periodically varying etch profile, the secondary structure having an extremity etched according to said etch profile and forming a textured surface.

22. The optical element according to claim 21, wherein each of said cores is doped with at least one dopant selected from the group comprising germanium, phosphorous, aluminum, fluorine and boron.

23. The optical element according to claim 21, wherein the textured surface provides an antireflecting effect on the optical element.

24. The optical element according to claim 21, wherein the textured surface defines a diffraction grating on the optical element.

25. The optical element according to claim 21, wherein the optical element is an optical fiber.

26. The optical element according to claim 21, wherein the optical element is a lens.

27. The optical element according to claim 21, wherein the optical element is a reflector.

28. An optical element having a textured surface made in accordance to a method according to claim 1.

* * * * *